United States Patent
Aiken

(10) Patent No.: US 6,240,409 B1
(45) Date of Patent: May 29, 2001

(54) METHOD AND APPARATUS FOR DETECTING AND SUMMARIZING DOCUMENT SIMILARITY WITHIN LARGE DOCUMENT SETS

(75) Inventor: Alexander Aiken, San Mateo, CA (US)

(73) Assignee: The Regents of the University of California, Berkeley, CA (US)

( * ) Notice: Subject to any disclaimer, the term of this patent is extended or adjusted under 35 U.S.C. 154(b) by 0 days.

(21) Appl. No.: 09/127,105

(22) Filed: Jul. 31, 1998

(51) Int. Cl.[7] .................................................. G06F 17/30
(52) U.S. Cl. .............................. 707/4; 707/531; 707/101; 707/7; 707/3; 345/326
(58) Field of Search ......................... 707/6, 5, 4

(56) References Cited

U.S. PATENT DOCUMENTS

| | | | |
|---|---|---|---|
| 5,202,986 | | 4/1993 | Nickel . |
| 5,274,805 | * | 12/1993 | Ferguson et al. ................ 707/7 |
| 5,281,967 | | 1/1994 | Jung . |
| 5,317,742 | * | 5/1994 | Bapat ................................ 707/3 |
| 5,410,671 | | 4/1995 | Elgamal et al. . |
| 5,511,159 | * | 4/1996 | Baker et al. ................ 345/326 |
| 5,566,329 | * | 10/1996 | Gainer et al. ................. 707/4 |
| 5,627,748 | * | 5/1997 | Baker et al. ................ 707/531 |
| 5,704,060 | * | 12/1997 | Del Monte ................... 395/600 |
| 5,819,300 | | 10/1998 | Kohno et al. . |
| 5,825,830 | * | 10/1998 | Kopf ............................. 375/340 |
| 5,832,520 | | 11/1998 | Miller . |
| 5,893,134 | | 4/1999 | O'Donoghue et al. . |
| 5,926,555 | * | 7/1999 | Ort et al. ..................... 382/124 |
| 5,929,421 | * | 7/1999 | Cherry et al. ............. 235/462.12 |
| 5,953,006 | | 9/1999 | Baker et al. . |
| 5,956,724 | * | 9/1999 | Griffiths ...................... 707/101 |
| 6,055,538 | * | 4/2000 | Kessenich et al. ........... 707/101 |
| 6,079,047 | * | 6/2000 | Cotugno et al. ............. 714/807 |

OTHER PUBLICATIONS

Heintze, N. "Scalable Document Fingerprinting" (pub. after 1996) Bell Laboratories, Murray Hill, NJ, pp. 1–12.
Brin, et al. "Copy Detection Mechanisms for Digital Documents" (pub. after 1994) Stanford University, Stanford, CA, pp. 1–12.
Shivakumar, et al. "Scam: A Copy Detection Mechanism for Digital Documents" (pub. after 1995) Stanford University, Stanford, CA, pp. 1–13.
Broder, et al. "Syntactic Clustering of the Web" (pub. after 1996) Digital Equipment Corporation and University of Arizona, pp. 1–13.

(List continued on next page.)

Primary Examiner—Kim Vu
Assistant Examiner—Anh Ly
(74) Attorney, Agent, or Firm—Beyer Weaver & Thomas, LLP

(57) ABSTRACT

A method and apparatus are disclosed for comparing an input or query file to a set of files to detect similarities and formatting the output comparison data are described. An input query file that can be segmented into multiple query file substrings is received. A query file substring is selected and used to search a storage area containing multiple ordered file substrings that were taken from previously analyzed files. If the selected query file substring matches any of the multiple ordered file substrings, match data relating to the match between the selected query file substring and the matching ordered file substring is stored in a temporary file. The matching ordered file substring and another ordered file substring are joined if the matching ordered file substring and the second ordered file substring are in a particular sequence and if the selected query file substring and a second query file substring are in the same particular sequence. If the matching ordered file substring and the second query file substring match, a coalesced matching ordered substring and a coalesced query file substring are formed that can be used to format output comparison data.

14 Claims, 9 Drawing Sheets

OTHER PUBLICATIONS

Shivakumar, et al. "Building a Scalable and Accurate Copy Detection Mechanism" (pub. after 1993), Stanford University, Stanford, CA pp. 1–9.

Manbur, Udi "Finding Similar Files in a Large File System" (pub. after 1993), University of Arizona, pp. 1–11.

Randal C. Burns and Darrel D. E. Long, "A Linear Time, Constant Space Differencing Algorithm", Department of Computer Science, University of California Santa Cruz, IEEE, Jan. 1997, pp. 429–436.

Jungkyu Rho and Chisu Wu, "An Efficient Version Model of Software Diagrams", Department of Computer Science Seoul National University, Seoul, IEEE, Feb. 1998, pp. 236–243.

* cited by examiner

METHOD AND APPARATUS FOR DETECTING AND SUMMARIZING DOCUMENT SIMILARITY WITHIN LARGE DOCUMENT SETS

BACKGROUND OF THE INVENTION

1. Field of the Invention

The present invention relates generally to computer applications and programming. More specifically, it relates to utility programs used to detect similarities and differences among multiple documents of the same or different type.

2. Discussion of Related Art

A common feature or utility in some word processing programs and operating systems is the ability to compare files and provide information on differences (or similarities) between the files. There are a variety of file comparison programs available which have different limitations and capabilities, for example, with regard to how and what comparison data is presented or the number of files that can be compared in one run. Many of these programs are adequate in certain aspects but have drawbacks in others making them poorly suited for certain applications. This is particularly true given the constantly growing trend to store, submit, transfer, copy, and otherwise manipulate information electronically.

One utility used to compare files in the UNIX operating system is known as diff. This program can compare up to three files or documents. The output of this program is typically two columns of data. One column displays line numbers in one (subject) document across from a second column displaying line numbers in the query document that are different from corresponding line numbers in the subject document. Thus, the diff utility is used when the documents are assumed to be generally similar. The program uses a dynamic programming algorithm that computes the minimal "edit distance" between two documents. An "edit distance" between two documents, or strings, is the length of a minimal sequence of insertions, deletions, and substitutions that transforms one to the other. From information about how the minimal edit distance is derived diff computes matching passages in the two documents, which are presented to the user in the column format described earlier. The program can not find differences among sets or large bodies of documents, but typically between two or among three documents at most.

Other methods of comparing files can be broadly categorized as information retrieval methods. These methods compare statistical profiles of documents. For example, one strategy used by these methods is computing a histogram of word frequencies for each document, or a histogram of the frequency of certain pairs or juxtaposition of words in a document. Documents with similar histograms are considered to be similar documents. Refinements of these methods include document preprocessing (e.g. removing unimportant words) prior to computing the statistical profile and applying the same information retrieval method to subsections of documents. Some of the primary drawbacks of these methods include tendencies to provide false positive matches and presenting output or results in a form difficult to quickly evaluate. False positives arise because it is sometimes difficult to prevent dissimilar documents from having similar statistical profiles. With respect to presentation, these methods often simply provide correlations. In sum, these methods can often provide too little information about similarities or differences among documents thus requiring the user to closely evaluate the results and refer back to the files being compared to determine whether meaningful differences or similarities exist.

Another method is based on a procedure known as document fingerprinting. Fingerprinting a document involves computing hashes of selected substrings in a document. A particular set of substring hashes chosen to represent a document is the document's fingerprint. The similarity of two documents is defined as a ratio C/T where C is the number of hashes the two documents have in common and T is the total number of hashes taken of one of the documents. Assuming a well-behaved hash function, this ratio is a good estimate of the actual percentage overlap between the two documents. However, this also assumes that a sufficient number of substring hashes are used. Various approaches have been used in determining which substrings in a document are selected for hashing and which of these substring hashes are saved as part of the document fingerprint. One way is to compute hashes of all substrings of a fixed length k and retain those hashes that are 0 mod p for some integer p. Another way is partitioning the document into substrings with hashes that are 0 mod p and saving those hashes. The difference from the first way is that the substrings selected are not of fixed length. In this method, a character is added to a substring until the hash of the substring is 0 mod p, at which point the next substring is formed. In order to reduce memory requirements, the program can set p to 15 or 20 thereby saving, in theory, every 15th or 20th hash value. However, based on probability theory, for a large body of documents, there will be large gaps where no hash value will be saved. This can potentially lead to the situation where an entire document is bypassed without having a single substring hash value saved for a fingerprint. More generally, if gaps between stored hash values are too long, a document's fingerprint will be faint or thin and, thus, ill-suited for comparison to other documents.

Therefore, it would be desirable to determine similarities among large sets of documents in a manner that guarantees that if a substring of a predefined length in one of the documents appears in another document, it will be detected, and thereby not rely on probability for measuring comparison accuracy. In addition, it would be desirable to present comparison results in a meaningful and easily comprehensible format to users thereby enabling quick evaluation of document similarities.

SUMMARY OF THE INVENTION

To achieve the foregoing, and in accordance with the purpose of the present invention, methods, apparatus, and computer program products for comparing an input or query file to a set of files to detect similarities and formatting the output comparison data are described. In one aspect of the present invention, a method of comparing files and formatting output data involves receiving an input query file that can be segmented into multiple query file substrings. A query file substring is selected and used to search an index file containing multiple ordered file substrings that were taken from previously analyzed files. If the selected query file substring matches any of the multiple ordered file substrings, match data relating to the match between the selected query file substring and the matching ordered file substring is stored in a temporary file. The matching ordered file substring and another ordered file substring are joined if the matching ordered file substring and the other ordered file substring are in a particular sequence and if the selected query file substring and a second query file substring are in the same particular sequence. If the matching ordered file substring and the second query file substring match, a coalesced matching ordered substring and a coalesced query file substring are formed that can be used to format output comparison data.

In another aspect of the present invention, a method of comparing two strings in a data processing system, where the strings can represent various types of documents or files, is described. Substrings common to the strings are identified. A subset of substrings, from within the common substrings, which occur in the same relative positions in the two strings are identified. Substrings which are present in the same relative positions in the two strings are then stored as a group or displayed as a group.

In another aspect of the present invention, a method of segmenting a file, representable as a string of characters, as one step in a file matching program is described. Multiple substrings or segments from the string of characters having a predetermined length and a beginning position are created. A predetermined offset or gap between the beginning positions of each consecutive segment is maintained. A file matching program using the multiple segments and the predetermined offset is executed. The program is able to detect a similar passage between two or more files where the passage has a length of at least the sum of the predetermined length and the predetermined offset.

In another aspect of the present invention, a method of comparing a first string and a second string is described. The first string is divided into multiple substrings of length l and offset or gap g between two substrings, where g is at least two characters long. A substring of length l is selected from the second string. It is then determined whether the substring of length l from the second string matches any of the multiple substrings from the first string. If the substring from the second string matches any substring from the first string, the substring from the second string is saved, at least temporarily. Finally, it is indicated that the substring from the second string matches a particular substring from the first string.

BRIEF DESCRIPTION OF THE DRAWINGS

The invention, together with further advantages thereof, may best be understood by reference of the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Figure 1A:
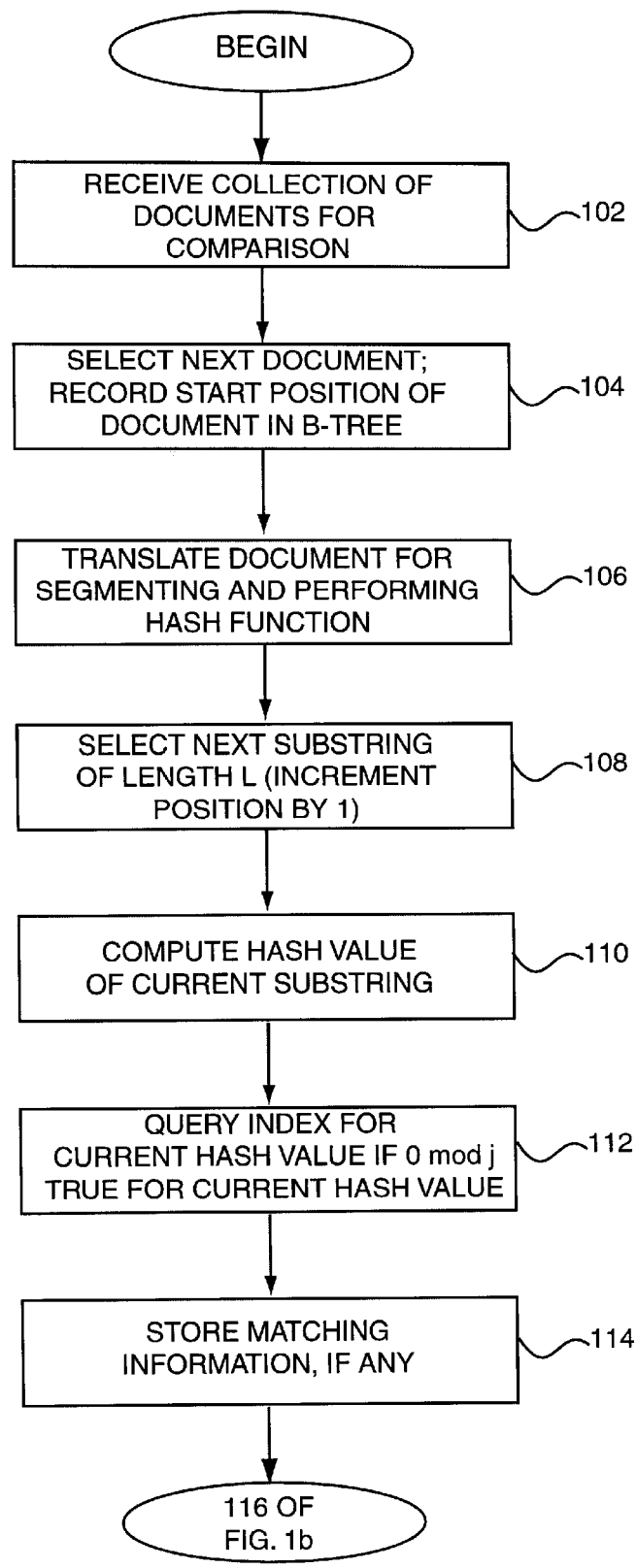
FIG. 1 is a flowchart showing a method of hashing, comparing, storing a query documents against documents already stored in an index file in accordance with one embodiment of the present invention.

FIG. 1 is a flowchart showing a method of querying and loading a document into an index file in accordance with one embodiment of the present invention. At a step 102 a corpus or collection of documents that are to be compared against each other is gathered. A document can be any logical entity such as a set of files comprising one program or multiple sections (e.g. attachments) in an e-mail message. The documents in the collection can be of the same type or have different types. For example, each file is a computer program in a particular language or a database file organized according to a particular database program. At a step 104 the first or next document in the collection is selected for comparison against the documents already loaded. If it is the first document, the index file (described below) containing hash and position values is empty. In either case, in the described embodiment, a position corresponding to the beginning of the selected document is stored in a B-tree or similar structure. As described in FIG. 2, a page or block in the index file can be expanded or appended with additional pages if a current page becomes full.

At a step 106 the document is translated or preprocessed from its original (e.g. human readable) format to a format suitable for segmenting and hashing. For the purposes of illustrating the described embodiment, a document is referred to as a string, such as a string of alphanumeric characters. A sample string can be a string of characters comprising a sentence or a line of computer code. In the described embodiment, the string is translated to a token string that represents and preserves the structure and content of the original or raw data string. Each string (i.e. document) is translated according to its document type. Translation rules are tailored specifically for the type or types of documents being translated, such as the syntax and semantics of a particular programming language or common or frequent words expected in documents from a particular source.

Figure 3:
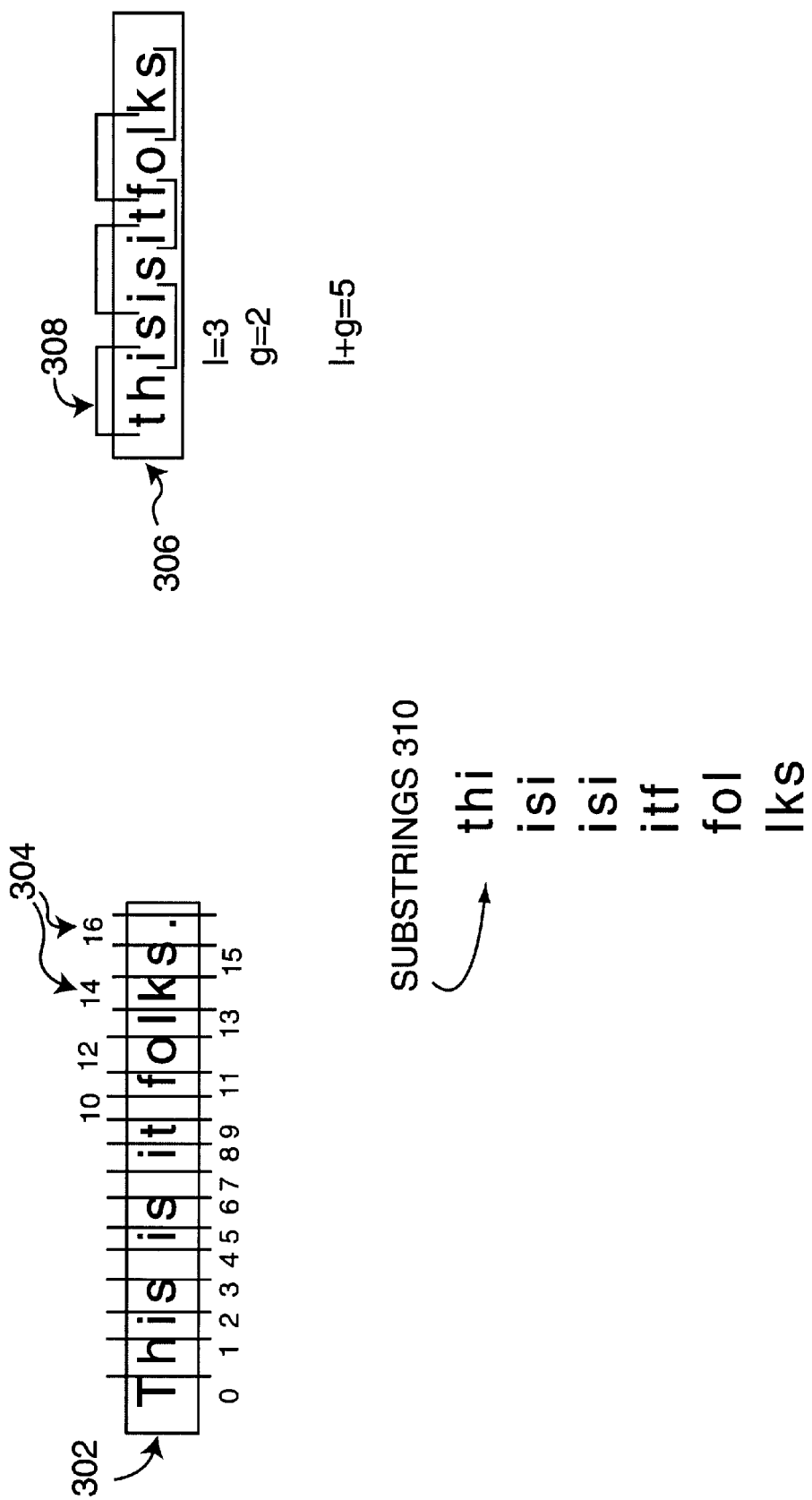
FIG. 3 is a diagram showing a transformation of a raw data string to a series of substrings using l and g in accordance with one embodiment of the present invention.

An example of a raw data string and a translated version of the same string is shown in FIG. 3. In that example, an English sentence is translated by having punctuation, white spaces, and capitalization removed. Further processing can include removing unimportant words such as "the" or "and." In another example using a computer programming language, a string containing computer instructions having real variable names and operators is translated to a token string. Thus, in the described embodiment, the string: if sales_revenue>operating_costs then projections=TRUE, can be translated to the token string: if <var> op <var> then <var> op true. In addition, in the described embodiment, the token string includes position data indicating the position of the tokens in the original document. This position data is used later in presenting the comparison data to a user. Thus, the result of translating or preprocessing is a series of token and position pairs <T,P> that are suitable for segmenting and hashing. In other preferred embodiments, the abstraction of the raw data string to a preprocessed data string can be performed using a variety of abstraction operations or translation sets that reduce the amount of data in the raw data string. This abstraction typically makes subsequent processing far more efficient.

At a step 108 the next or first substring of length l is selected and a position marker is incremented by one to indicate the beginning of the selected substring. An appropriate length l can be chosen empirically based on the type of documents that are being queried and loaded into the index file. Substring length l is the length of a substring within a translated string that is hashed and stored in the index file. The number of substrings within the translated string that is hashed is determined by an offset or gap g discussed in greater detail below and in FIG. 3. These values, specifically l, can be chosen based on experience working with the type of documents being hashed and loaded, or can be determined based on an intuitive or natural feeling of how many characters or words one has to see to suspect that some copying has occurred between two documents. However, in the described embodiment substring length l and offset g are each constant for all documents of a particular type that are compared against one another. Normal text documents may have a substring length in the 30 to 40 character range. For computer programs, l may be in the 40 to 50 character range depending on the programming language. For executable or binary files, l can be in the range of several hundred characters.

At a step 110 a hash function is applied to the selected substring within the translated string, or document. The hash function creates a hash value of a fixed length m. The hash value is stored in the index file which, in the described embodiment, is an extensible hash table made up of a linked list of hash pages described in greater detail in FIG. 2 One purpose of using a hash function is to maintain a random distribution of hash values in the index file. Any well-behaved hash function can be used in the described embodiment. One criteria for a well-behaved hash function is not returning the same hash value for two different substrings.

An example of a hash function includes taking the product of a numeric representation of a character and a prime number. Each character in a substring must be part of an alphabet, such as the ASCII character set. Each member of this character set has an associated unique prime number. Another prime number, p, larger than any prime number corresponding to the character set is chosen. This number is raised to a certain power and multiplied by the prime number corresponding to a character. These products are then summed. For example, if the substring contains the prime numbers 7,3,9, the first part of the hash function would be the calculation $7p^3+3p^2+9p$. The final hash value is the modulus of this sum by $2^{32}$ which is the word length of the computer. This number can vary depending on the type of computer being used. In other preferred embodiments, hash functions using other formulas and calculations can be used.

At a step 112 the program queries the index file for the hash value calculated at step 110. The index file will not contain any hash values to query against if the document is the first document in the collection. However, it is possible to have a substring occur more than once in a single document in which case the index file may contain a hash value to query against. As described in FIG. 2, the first n bits of the calculated hash value is used to identify a hash page in the index file. Thus, the first n bits of the current hash value are used to identify a certain hash page in the index file and that page is searched for the remaining m-n bits in the current hash value. In the described embodiment a hash page can have overflow pages associated with it that may also need to be searched.

At a step 114 the program stores data relating to any matches found in the index file after queried for a current hash value. In the described embodiment, a list of <hash value, position> pairs are stored in a temporary file. The index file stores positions of each hash value. Thus, at step 114 if a current hash value is found in the index file, the position and value stored in the index file matching the current hash value is stored in the temporary file until all the substrings in the query document (as described in step 108) have been hashed and searched for in the index file. In the described embodiment, a position value encodes (i.e. it does not explicitly state) the name of the document and an offset within that file where the hash value begins. Thus, this position value performs as an absolute position or address within the collection or corpus of documents insofar that it can be used to go directly to a position within a document regardless of where that document resides in the corpus of documents. If the collection of documents being compared against each other are expected to be dissimilar, step 114 will normally result in small amounts of matching data or none at all. However, this depends on the nature of the collection of documents being compared.

To save memory, not every substring's hash value is saved. In a preferred embodiment only those substrings beginning at or near fixed boundaries in a document (string) are saved. At a step 116 the program checks whether it has passed a particular position or boundary in the string. This position, referred to as the gth position (for example every 5th or 10th position in the string), is an offset or gap between the beginning of every new substring and the previous substring. At step 116 the program determines whether it has passed the gth position since having saved (or stored) the last hashed substring. Each time the program passes the gth position it will want to save another hash value and generally it will not want to save more than every gth substring. If the program has passed a gth position in the string, it will increment a g counter at a step 118.

If the program determines that it has not passed a gth position at step 116 or if the program increments the g counter at step 118, control goes to a step 120 where the program checks whether the g counter is greater than zero and whether the hash is 0 modulo j for a predetermined value j. In the described embodiment, j has a value that is less than g. By using 0 mod j to determine which substrings to save (described in step 122 below) in the described embodiment, the program is able to reduce the number of substring hashes that need to be queried at step 112. Only those substrings that have a hash value that is evenly divisible by j need to be searched for in the index file. Returning to step 116, once a gth boundary or position is passed, the program is ready to save another hash value. It will do this the next time it determines that 0 mod j is true for a hash value of the current substring.

At step 120, if the g counter is greater than zero (indicating that the program is ready to save another hash value) and the hash value is evenly divisible by j, the hash value of the substring and its position in the document is saved in the index file at a step 122. The g counter is also decremented by one at step 122. Normally this will reset the counter to zero but it is possible that the counter was greater than one if the 0 mod j condition had not been met within several substrings of length g. When the hash value and position are saved at step 122, the index table may need to be updated. The size of the index file is increased if certain criteria are met. For example, if currently existing hash pages or blocks are appended with overflow pages to the point where access time for searching for a substring exceeds a predetermined value, the size of the entire index file can be doubled. This doubling of size will occur when the number of hash pages in the index file is set according to $2^n$, where n is increased by one whenever the index file needs to be expanded. When this occurs, the addresses or boundaries of the newly formed hash pages change from their values before the index file was extended. The addresses of the hash pages do not change when individual hash pages are appended with overflow pages since the overall structure of the index file does not change.

The program checks whether the last position or character in the current document has been reached at a step 124 if it is determined at step 120 that the g counter is zero or the hash value of the substring is not evenly divisible by j. The program also goes to step 124 after saving a <hash value, position> pair and decrementing the counter at step 122. If the end of the document has not been reached, control returns to step 108 where the next substring of length l is selected and the process is repeated. If the last character in the document has been read, the program performs a clustering operation that integrates or incorporates the current document into an existing cluster of documents if the program determines that the current document has a sufficient number of matches with any of the other previously loaded documents. The clustering is preferably done using the union/find operation. The union/find algorithm is a method known in the field of computer programming. Step 126 is described in greater detail in FIG. 4.

Control then goes to step 128 where it is determined if there are any other documents in the collection of documents received at step 102. If there are more documents, control goes to step 104 where the next document is selected, followed by preprocessing and the other steps described above. If the last document has been examined, the program goes to step 130 where the data relating to the matching hash values is coalesced into passages and presented to the user. This process is described in further detail in FIG. 5. After the data has been coalesced at step 130 the comparison of the collection of documents is complete.

Figure 2:
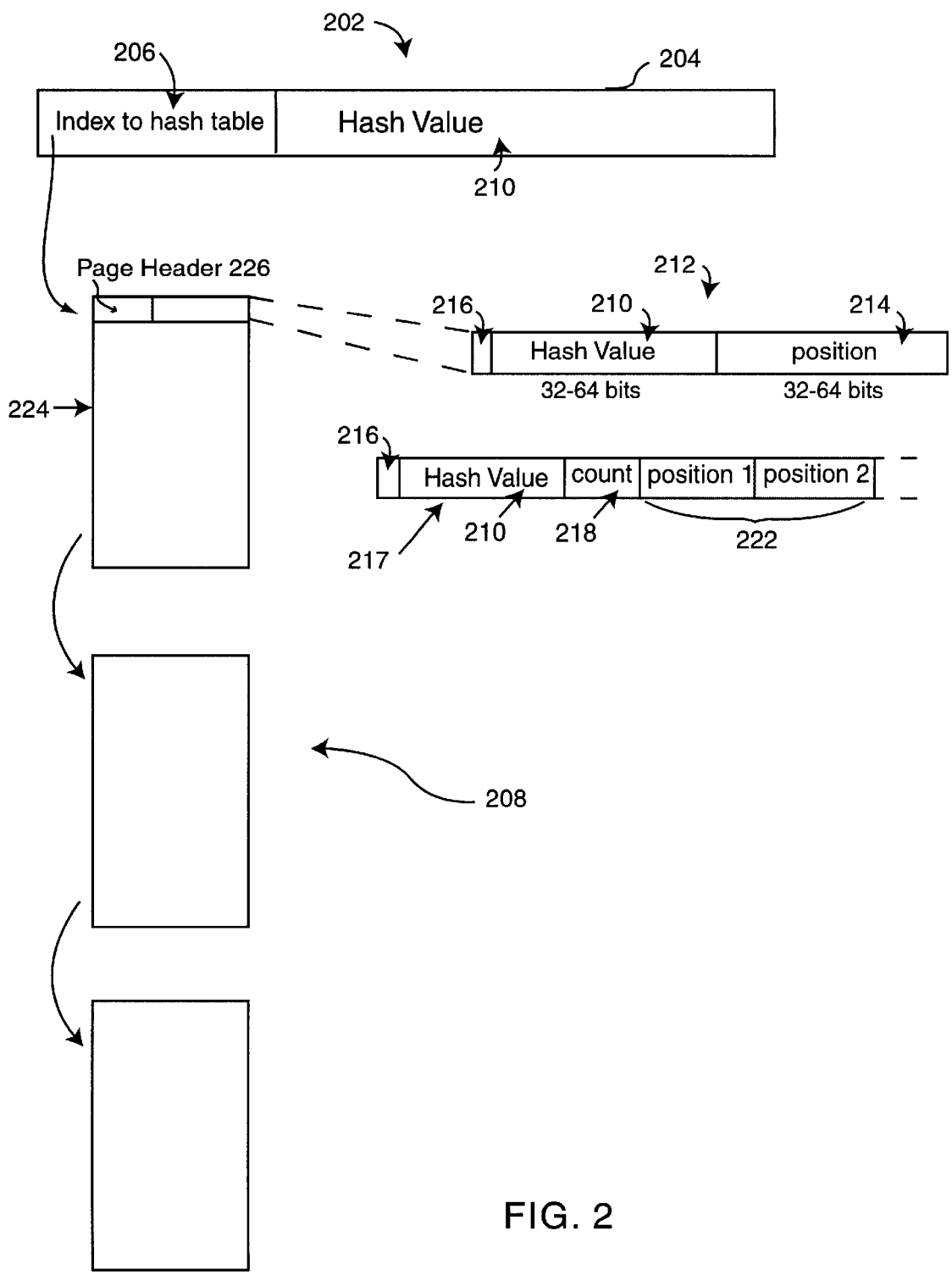
FIG. 2 is a block diagram of an index file and of records contained in the index file in accordance with one embodiment of the present invention.

FIG. 2 is a block diagram of an index file and of records contained in the index file in accordance with one embodiment of the present invention. The index file, also referred to as a hash table, contains a portion of a substring hash value followed by position data. In other preferred embodiments the index file can be implemented using other data storing constructs such as a neural network. For example, a neural network can be trained to recognize substrings it has seen before and a query document can then be run through the network in order to match substrings. In the described embodiment, a hash value is computed on a substring of length l (typically measured in characters) and is made up of m bits. A hash value 202 is shown at block 204. In the described embodiment, m is 32 to 64 bits. A first portion of hash value 202 is an index 206 of length n bits, typically 8 to 16 bits, that acts as a pointer to a hash table 208. A value 210, the remaining portion of hash value 202, is stored in a hash table record 212 in table 208. Position data 214 is also 32 to 64 bits long and is stored following value 210. As described above, position data 214 contains the name of the document or file that is being hashed and stored followed by the offset within the document where the substring is located. In other preferred embodiments, a non-numerical based hash function can be used to build the index file. For example, a semantic-based function where letters in a substring can be used to distribute substrings in the index file. More broadly, the index file can be seen as an association list in which substrings can be indexed to some other value.

In a preferred embodiment, preceding value 210 in record 212 is a single-bit field 216 that indicates whether value 210 represents a substring that appears more than once in the index file. In the described embodiment, if this bit is zero, value 210 represents only one substring in the index file, which is expected under most circumstances. That is, it is not expected that an exact duplicate of a substring appear even once in a set of documents. However, should this occur, field 216 will contain a one and a variation of record 212, shown as a record 217 will have an additional count field 218 that will contain the number of times a substring appears in the index file. Count field 218 is followed by multiple position fields 222 each of which encodes the same data as position data 214.

Index file 208 is typically comprised of multiple hash pages, an example of which is shown at 224. In the described embodiment the number of pages is base two. Thus, there is initially one page in the index file which can expand to two, four, eight, 16, and so on, when needed. At the beginning of each page is a page header 226. All the fields in header 226 are fields normally expected in a header for a page in a hash table. One field worth noting is a page overflow field that indicates whether the hash page has overflow pages by containing a pointer to the first overflow page. Step 122 of FIG. 1 includes updating the index file and data structure for determining a position of a substring in a document and for storing data related to a particular document. The data structure referred to can be a B-tree type structure that contains information on which document and offset is described given a particular <hash value, position> pair. In other preferred embodiments, a binary tree or simple look-up table can be used to store this information.

Briefly, in the described embodiment, each leaf node in the B-tree contains a code indicating the name of a document and the range of bytes in that document. The B-tree can also contain the total number of hashes in a particular document. By following the nodes in the B-tree, the program can determine which document a particular position value belongs to or, similarly, the beginning and ending bytes of each document. In the described embodiment, the position value encodes the name of the document and the offset within that document where the hash value begins. This B-tree structure is used by the program to retrieve data regarding the boundaries of documents, the total number of hash values in a particular document, document type (if needed), and other related information. Thus, a position value can be inserted into the B-tree and a particular document and offset can be determined.

FIG. 3 is a diagram showing a transformation of a raw data string to a series of substrings of length l and gap g in accordance with one embodiment of the present invention. In a simple illustration, a raw data string 302 represents a text file such as a word processing document. Shown above string 302 are position indicators 304 that show positions 0 through 16 in string 302. As discussed in step 106 of FIG. 1, the raw data string is preprocessed or translated to place it in a form suitable for segmenting and hashing. A translated data string 306 shows an example of how raw data string 302 can be translated. Translated string 306 is a string of characters with capitalization, white spaces, and punctuation removed. Further preprocessing of raw data string 302 could include removing words "this" and "is" under the assumption that they are words that would be used frequently anyway and would not be useful indicators of copying.

Substring length l and offset or gap g are then used to segment translated data string 306. Length l can be determined empirically and can vary widely depending on the type of documents being stored for future comparison. For a normal text file l is typically in the range of 30 to 40 characters. Typically when a person sees this number of consecutive characters in two documents, copying is suspected. The number will likely be different for other types of documents such as computer programs or files storing records in a database. The offset or gap g between hashed substrings is determined by availability of storage and the level of success or probability in finding matches among documents.

For the purposes of illustration, in FIG. 3 length l is three and the offset g is two. In the described embodiment, g must be less than l, and in most cases will be significantly smaller than l. Brackets 308 illustrate how translated string 306 is segmented. Each segment is three characters long and each new segment begins two characters after the beginning of the previous segment. This results in six substrings 310, which may include duplicate substrings. A hash function is applied to each of the substrings, as described in step 106 of FIG. 1, to derive a hash value 202. Position data for each of the substrings is also stored in the index file. For example, a position value for substring "fol" encodes the name of raw data string 302 (e.g. "sample_text.doc") and its offset within the string, which in this case is byte 11.

In the example shown in FIG. 3, l+g is five characters long. If a second data string, i.e. a query document, is compared against data string 302 and contains a substring of length five that has the same consecutive characters as any substring of length five in string 302, a comparison method based on a preferred embodiment will detect that three of the five characters in the substrings match. Thus, if the query document contains "thisi" or "tfolk" for example, this similarity to raw data string 302 will be detected and presented to the user. By increasing g, or l, a longer identical substring must be present in the query document in order for the comparison program to guarantee the detection of the similarity. Thus, in another example where index space is more limited and g is four instead of two (and l is greater than four), the query document would have to contain a substring (the sum of l and g) of length seven in order for the comparison program to detect the similarity. Substrings such as "thisisi" or "itfolks" would have to be present in the query document for the similarity to be detected.

As mentioned above with respect to step 120 of FIG. 1, in the described embodiment, the way a substring is chosen for storage in the index file depends not only on offset g but also on the condition 0 modj criteria thereby introducing the variable j. Every hash value of the current substring that satisfies 0 mod j after having passed a g boundary in the string is stored in the index file. By using the 0 modj criteria for saving substrings, where j is relatively small compared to g, the offset or gap between each saved substring will very likely be close to g but will not be guaranteed to be g. Based on probability theory, the gap will typically vary between a few positions before and a few positions after each gth position in the string. If g is set to two and j is one, the segmenting would not be different from the segmenting shown in FIG. 3; that is, substrings would be chosen strictly by g (whenever j is set to one). In another preferred embodiment, every gth substring of length l is hashed and stored in the index file. By using this method, the program can guarantee that if there is the same passage of length l+g in two or more documents, the program will detect a same passage of length l.

Figure 1B:
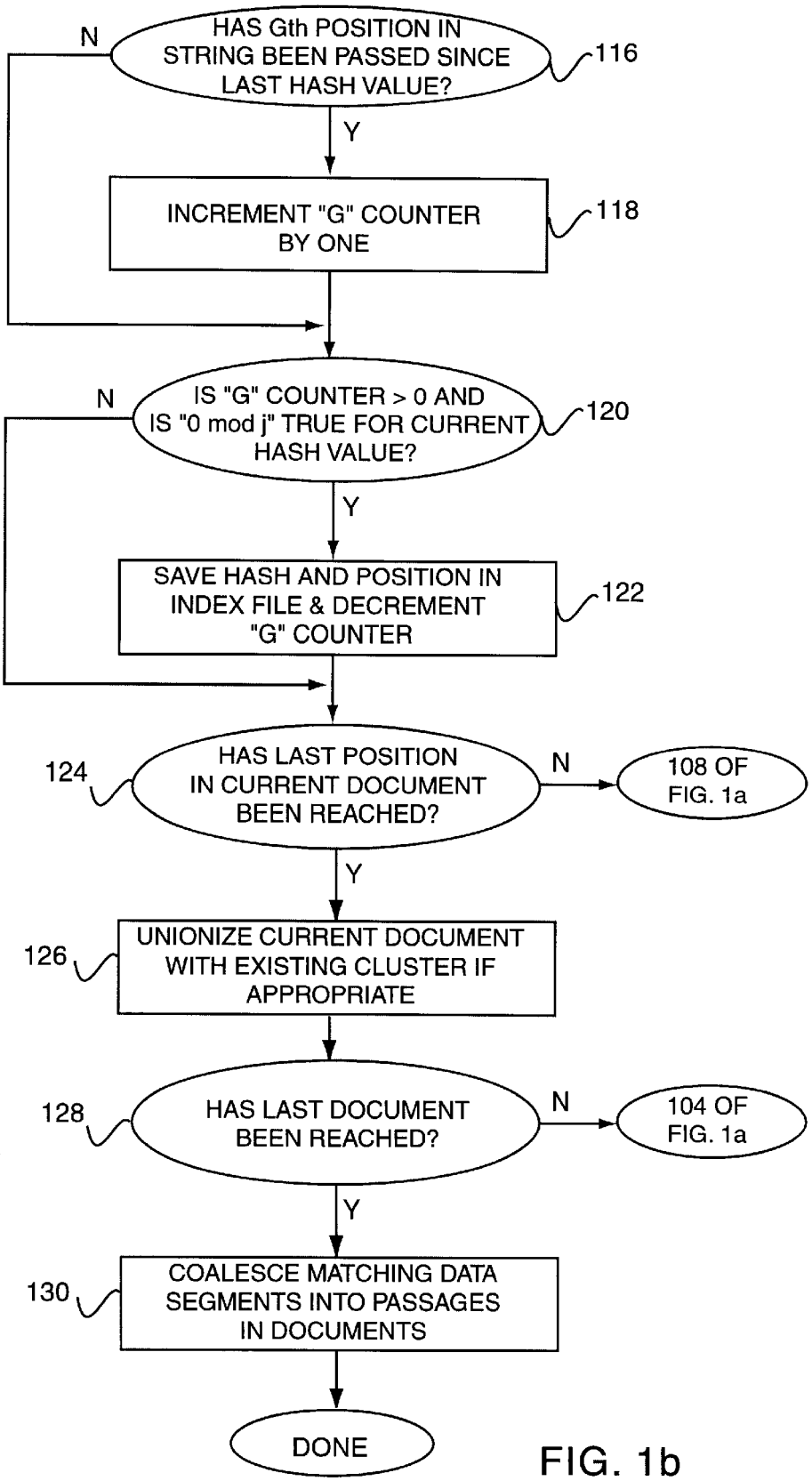
Figure 4A:
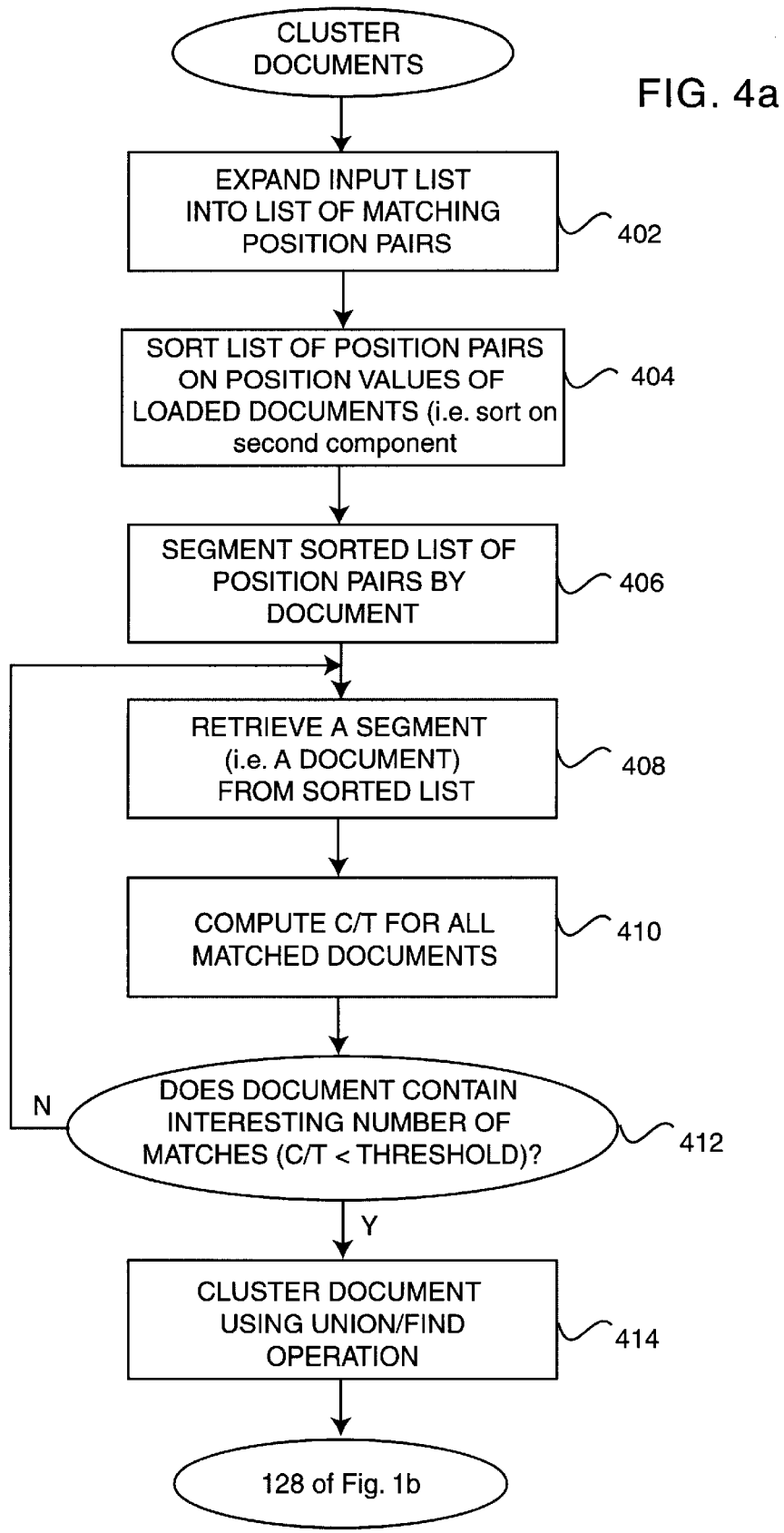
FIG. 4a is a flowchart showing in greater detail step 126 of FIG. 1b in which a current document is clustered based on matches with documents previously loaded into the index file.
Figure 4B:
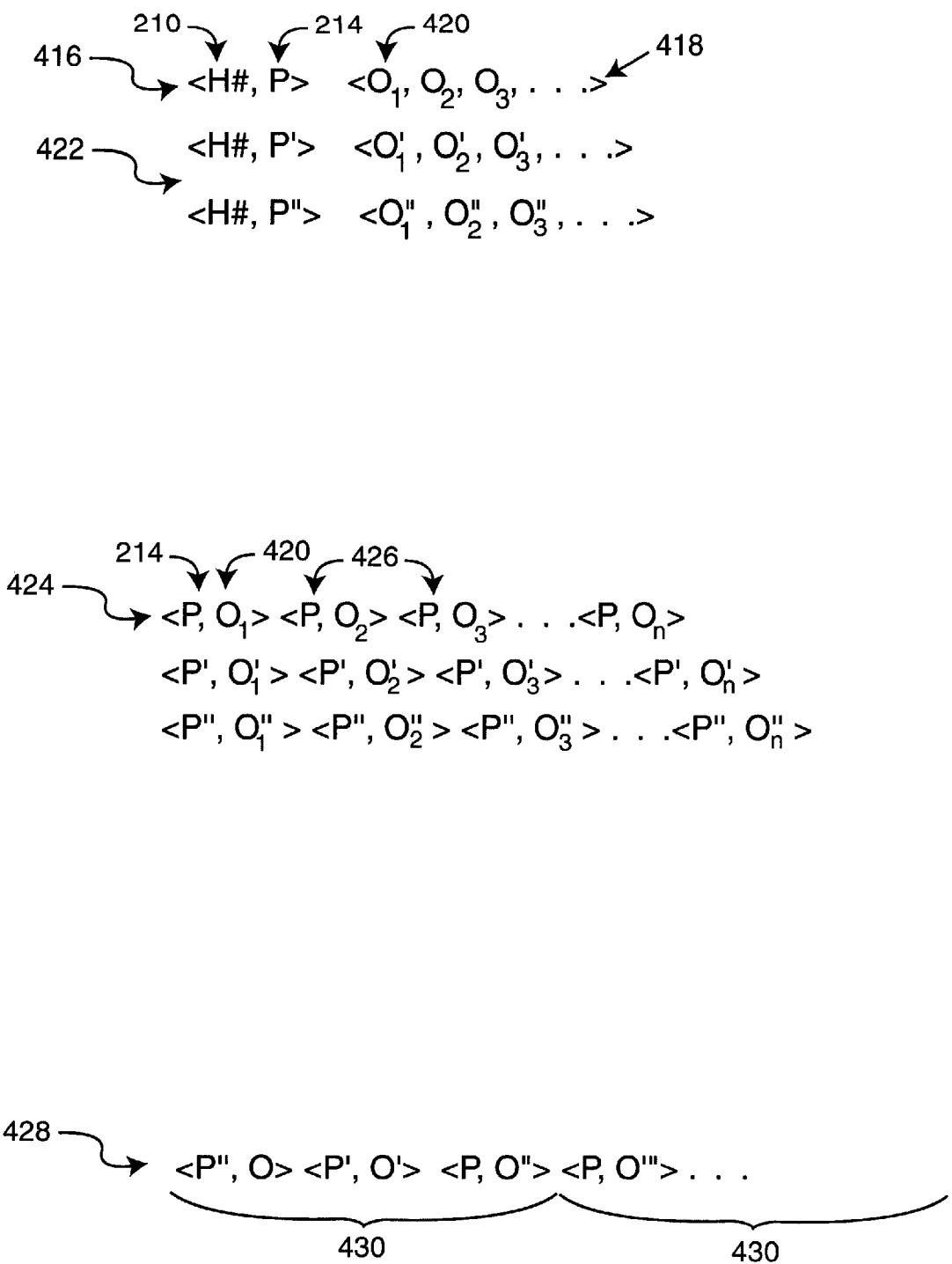
FIG. 4b is an illustration of a format of a match list in accordance with one embodiment of the present invention.

FIG. 4a is a flowchart showing in greater detail step 126 of FIG. 1b in which a current document is clustered based on matches with documents previously loaded into the index file. The input for a step 402 is a list of matches that was created at step 114 of FIG. 1a. FIG. 4b is an illustration of a format of a match list in accordance with one embodiment of the present invention. In the described embodiment, this list contains at least three items of information: a hash value 210, its position 214 in the current document, and a list of positions $O_i$ in other (previously indexed) documents that have the same Attorney Docket No. hash value 214. However, it is possible that a hash value may appear two or more times in the same document and may have been stored in the index file. In this case, the matching $O_i$ position represents a position in the same document as opposed to the more typical situation of representing another document. The hash value and position pair is shown in FIG. 4b as tuple 416. Associated with tuple 416 is a list 418 containing at least one position value $O_i$, shown as item 420, indicating a position in another document that contains the same hash value 210. The current document can have other hash values that were also matched with hash values in other documents represented by tuples 422 and their corresponding position lists.

At step 402 each list is expanded into pairs or tuples in which hash values have been eliminated and that contain only position values. FIG. 4b also shows an expanded position list 424 created at step 402. This list is created by pairing each positionPin the current document with each matching position $O_i$ in other documents. List 424 includes a series of tuples where each tuple 426 has a position value 214 from the current document and a position value 420 from another document. However, as mentioned earlier, it is possible that a hash value may appear two or more times in the same document and may have been stored in the index file. In this case, the matching $O_i$ position represents a position in the same document as opposed to the more typical situation of representing another document. Thus, in each list 424, position value 214 of the current document will be the same but the position values $O_i$ from the other documents will be different. This is done for all position values in the current document that have matches in other documents. Typically, in applications where the documents are not expected to have many similar passages, these lists are not very long and can be stored in main memory for quick access.

At a step 404 the expanded list of pairs 424 created at step 402 is sorted based on the position values 420 indicating matching positions in the other documents. This creates a single list of tuples sorted such that position values $O_i$ from a single other document (i.e. a document that has already been indexed) are grouped together sequentially in the list. FIG. 4b contains an illustration of a list sorted according to position values in other documents. As shown in a list 428, position values 420 are increasing. As a result, position values from the current document become unordered or random. At a step 406, list 428 is segmented where each segment 430, for example, represents a single document. In the described embodiment, the segmenting is done using the B-tree described above. Using the B-tree, which contains the beginning and ending positions of documents stored in the index file, the program can determine where the boundaries of the documents are in the sorted list.

At a step 408 the program retrieves a segment, representing a single document, from the sorted list. At a step 410, a ratio C/T is computed for the retrieved document. The similarity of two documents is defined as ratio C/T, where C is the number of hashes the two documents have in common and T is the total number of hashes taken of one of the documents, which can be the current document or the smaller document. In the described embodiment, the number of hashes the two documents have in common is equal to the number of position pairs in the segment representing the retrieved document. The total number of hashes T can be drawn from the B-tree which also stores the total number of hashes in each document. By using this ratio, the percentage similarity between the current document and the document chosen at step 408 from the sorted segment list can be calculated.

At a step 412 a threshold is used to discard the retrieved document if the document does not contain a certain match ratio. In the described embodiment, if C/T is less than the threshold (e.g. a predetermined system parameter), the matches associated with the retrieved document are discarded, thereby effectively eliminating the document from further analysis. By performing this filtering operation, only documents having an interesting or significant number of matches with the current document are retained. The value of the threshold is based on a policy decision as to what level of similarity is significant given external factors, such as the type of documents being compared. Thus, at step 412 the program determines if the retrieved document has a sufficient number of matches. If not, control returns to step 408 where the next document segment in the sorted list is retrieved. If the number of matches in the retrieved document is significant, control goes to a step 414.

At step 414, the program clusters the retrieved document with existing clusters of documents. The purpose for clustering is to determine whether there are other groups of documents of which the current document can be part based on similarities. In the described embodiment, the clustering is used to present in a meaningful way to the user passages of similar text from groups of documents where each group is expected to have at least some similar passages. If the current document is not grouped with an existing cluster, it creates its own single-document cluster, which can subsequently be clustered with incoming documents and existing clusters. In another preferred embodiment the clustering can be done after all the documents in the collection have been indexed, which can be referred to as batch clustering as opposed to incremental clustering described above.

Figure 4C:
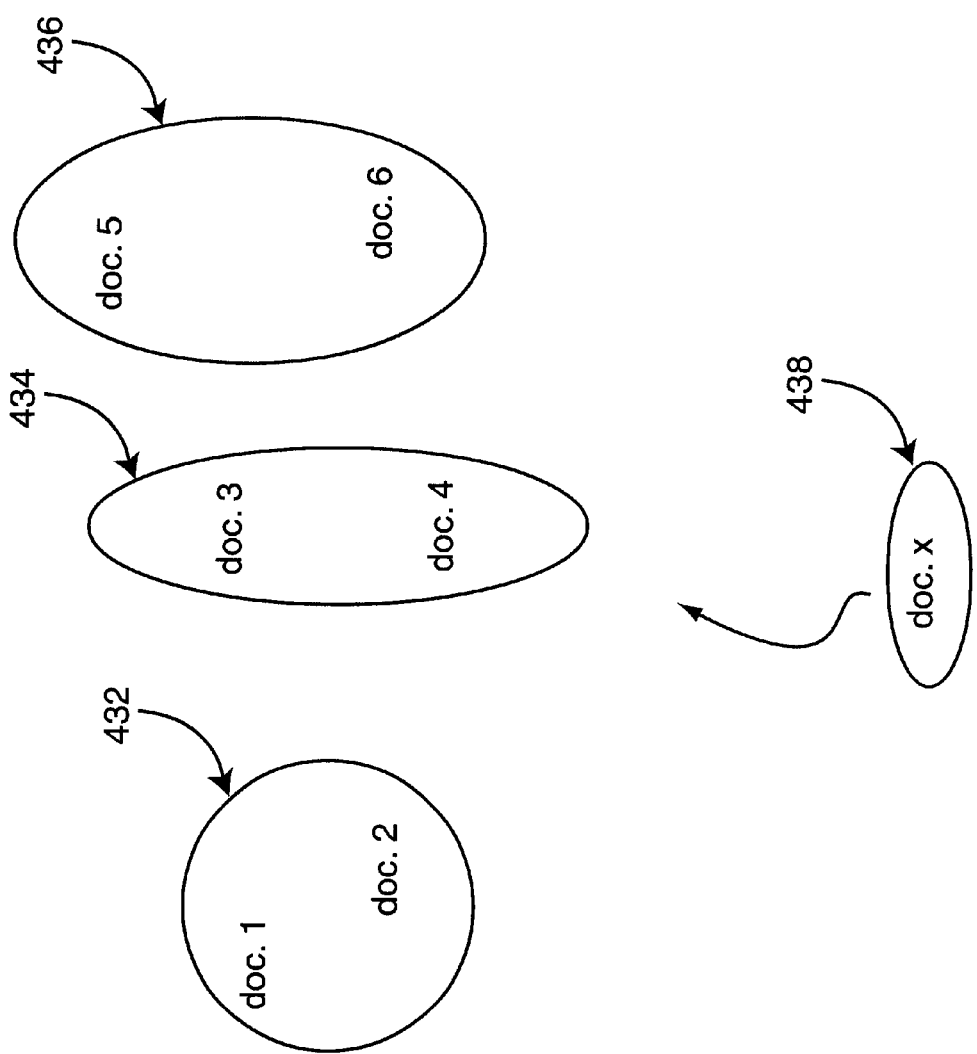
FIG. 4c is an illustration of a data structure showing how documents can be clustered in accordance with one embodiment of the present invention.

FIG. 4c is an illustration of a data structure showing how documents can be clustered in accordance with one embodiment of the present invention. Shown are three clusters 432, 434, and 436. A current document 438 is brought in. The clustering operation may be performed using a standard union/find algorithm where the program first determines to which set or existing cluster the document belongs. The program then takes the union of the current document and the set of retrieved documents (i.e. those documents retrieved at step 408). This can be done by taking a representative element or document from an existing set or cluster and comparing it to the current document. If the element in the current document is found in the cluster, the document can be unioned with the cluster. The two previously existing sets (the current document being one set) are eliminated and a new cluster is formed. This is a well-known procedure and can be done in nearly linear time. The union either results in the current document being joined or clustered with a set of retrieved documents or, if there is no union, a new single-document cluster made up of the current document. It is also possible that the current document belongs to two or more existing clusters in which case the clusters are joined to form yet a larger cluster of documents.

Figure 5:
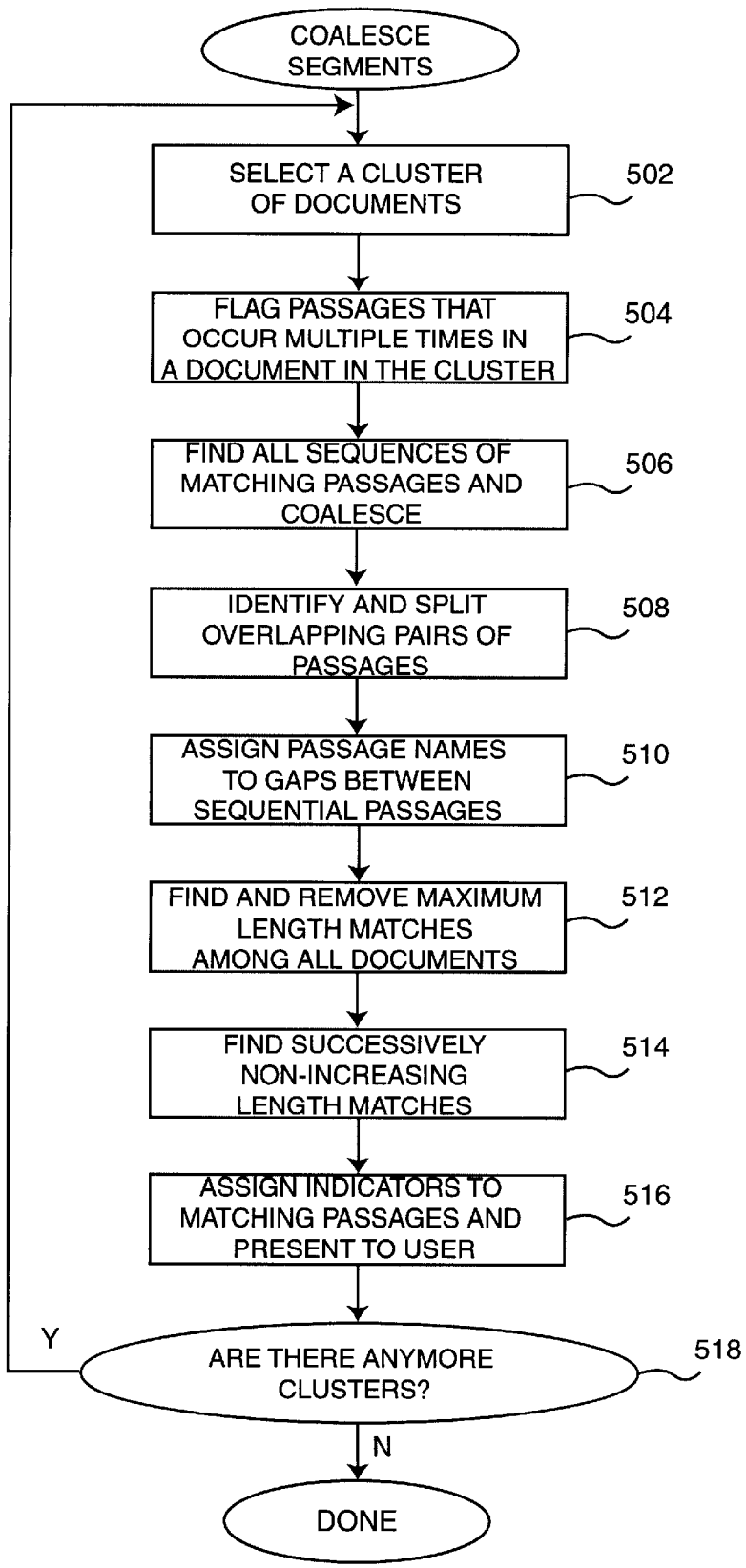
FIG. 5 is a flowchart showing in greater detail step 130 of FIG. 1b of coalescing matching data segments into passages and presenting output to users in accordance with one embodiment of the present invention.

FIG. 5 is a flowchart showing in greater detail step 130 of FIG. 1b of coalescing matching substrings into passages and presenting output to users in accordance with one embodiment of the present invention. For the purpose of illustrating a preferred embodiment of the coalescing operation of the present invention, a cluster containing two documents is described. The methods and techniques described below for a cluster of two documents can be extended to coalesce documents in a cluster containing multiple documents, and is not intended to be limited to clusters of a pair of documents.

The coalescing procedure operates on a cluster of documents that was formed at step 414 of FIG. 4a and shown in FIG. 4c. Thus, documents that are potentially coalesced are those documents from a single cluster. At a step 502, one is selected (the "current cluster") from the group of clusters. In the described embodiment, the data structure representing the clusters can be kept in main memory instead of on disk given the typically small amounts of memory needed to store cluster data, although the size can vary according to the application and type of documents being compared. The coalescing operation is performed on a cluster because a cluster is a much smaller set of documents compared to the potentially huge collection of documents and are far more likely to have significant similarity. In another preferred embodiment, the coalescing operation can be performed without the clustering procedure thereby using the original full set of documents. This may be preferred if the original set of documents is small. At a step 504 the program flags all substrings that appear more than once in a document in order to process duplicate passages (appearing two or more times) in a document more efficiently. This is done by examining the hash values encoded in the 0's. At a step 506 the program finds all sequences of unique position pairs among all the documents in the current cluster and coalesces those pairs into longer segments. This operation begins by examining the sorted list created in steps 404 and 406 of FIG. 4a and illustrated in FIG. 4b, where the list of position pairs are sorted according to previously indexed documents ($0_i$ values). At step 406 the sorted list is segmented into documents that have already been loaded in to the index file (i.e. hash table).

Step 506 is performed by first checking each position (e.g., value 420 in FIG. 4b) in the sorted list corresponding to the documents in the current cluster. For each position pair in the sorted list, the program checks whether the $0_i$ values 418 are in sequence by referring to the B-tree. In order to be in sequence, a value $0_{i+1}$, should not preceed $0_i$. Thus, the program scans the sorted list and determines whether the next $0_i$ position in the list is adjacent to the current 0 position. Since the length l is fixed, adjacency can be determined to be true if $0_i > 0_{i+1} - 1$. This calculation indicates whether the two current $0_i$ positions are adjacent (or overlapping), or whether there is a gap or disjoint between them. Data in the B-tree can be used to determine the values for the 0 positions. If the difference between those values is equal to or less than 1, they are considered to be in sequence. Similarly, each P position (e.g., value 214 in FIGS. 2 and 4b) in the position pair is examined to see if it is in sequence with the P position in the next position pair, and whether the differences in length is the same as the difference in length between the 0 positions. In the described embodiment, this can be done by checking whether $0_i - 0_{i+1} = p_i - p_{i+1}$. If these conditions are met, the program coalesces position pairs to form a single position pair with an associated length where the length is greater than 1 depending on how many position pairs were found to be in sequence. Thus, the resulting list of position pairs will likely have fewer position pairs than the original sorted list and some of the pairs will have an associated length value greater than 1. This check can be extended to cover situations where the program detects similarities among three or more documents (in addition to or to the exclusion of detecting similarities between two documents). This can be done by checking whether $0_i-0_{i+1}=p_i-p_{i+1}=N_i-N_{i+1}$, where N represents a third document in the cluster.

At a step 508 pairs of passages that overlap are identified and split up for all documents in the current cluster. The purpose of step 508 is to eliminate overlapping pairs that have the same offsets (i.e. overlap the same amount) between two documents by segmenting the overlapping pairs into three non-overlapping passages. This step simplifies processing since at this stage all disjoints in the string are eliminated. This is conveyed by the conditions described above with respect to step 506 (i.e. by checking if $0_i \leq 0_{i+1}-1$, and whether $0_i-0_{i+1}=p_i-p_{i+1}$) Thus, every instance where the program detects the same overlapping pairs, the two overlapping passages are replaced with three segments: a first segment that consists of only the first passage, a second segment that corresponds only to the overlapping section, and a third segment that consists only of the remaining portion of the second passage. A new name is assigned to the middle overlapping portion and the hash values for the two segments are reassigned to the (now shorter) non-overlapping sections.

This is done by first scanning the sorted list (sorted by $0_i$) and making note of all places where there are overlapping $0_i$'s by examining their positions in the B-tree. In another preferred embodiment, the difference between $0_{i+1}$ and $0_i$ can be determined and compared to 1. If the difference is less than or equal to 1, the segments overlap. This information is stored in a temporary data structure. The information is used to replace all instances of the overlapping passages with the three new passages. The program searches the index file for the hash value of the first passage. Once it is found, record 212 of FIG. 2 will indicate all the positions that the hash value occurs in the corpus of documents. Those positions that fall within any of the documents in the current cluster are replaced with the new hash values.

A similar procedure is applied to the P positions in the sorted list. First, the list is sorted based on p, instead of 0. The program then checks for overlaps in P by using position data in the B-tree. Similarly, in other preferred embodiments, overlaps in P can be determined by comparing the difference between $p_i-p_{i+1}$ to 1 since the position pairs have been segmented into documents and the program is checking for overlaps within a single document. For those overlaps that have the same offset as overlaps in the 0 positions, the information stored in the temporary data structure is used to replace the overlapping P passages. Since other position pairs may contain the P value being changed, the P value in those pairs are changed as well to keep the value consistent. In the described embodiment, the temporary data structure maps hash values of segments to positions of those segments in a document.

At a step 510 filler or dummy passages are inserted to fill any gaps between passages. This is done for each document in the current cluster to facilitate subsequent string operations. This gap should not be interpreted by the program to mean that the first pair and the pair following the gap are adjacent. The purpose is to create a continuous string of non-overlapping segments or passages. Step 510 further simplifies the string transforming it to an abstract of the original document. In the described embodiment, each filler passage is sized to exactly fit each gap in the sequence of passages making up a document.

At a step 512 the program finds the maximum length passage that matches between the two documents in the current cluster and then removes that passage. In the described embodiment, the steps preceeding step 512 in FIG. 5 transform the documents in a cluster into efficient and manipulable strings of segments that can now be processed to detect similar passages. Because the documents have been simplified to the form of these strings, the problem of identifying similar passages has been substantially reduced. In the described embodiment, the program focuses attention on a few documents (i.e., a cluster) that actually do have some common material out of a potentially large collection of documents.

One method of performing step 512 is a brute force algorithm that keeps a marker and counter for the two documents or strings. For example, for the two strings:

string 1: HFLKXAB string 2: ABZFLKW the program first places a marker at H in string 1 and checks if there is an H in string 2. In this case there is no H in string 2 so the counter is zero. The marker is then moved to F in string 1 and the program will increase the counter to one when it hits the first F in string 2. The marker will then read the L in string 1, match it with the L in string 2, and increase the counter to two. After reading the K in both strings, the counter will be increased to three (the counter is incremented when the sequence of characters is the same). The program continues until the end of the strings and notes that the longest substring was three. The FLK substring is assigned a new identifier, such as a unique number or letter, and is then removed or flagged to indicate that it has already been examined, so the program can perform a step 514. In another preferred embodiment, the edit difference between the strings can be computed and from that the maximal matching passages can be derived. This method can be used in place of the brute force algorithm described above or in conjunction with it. An "edit distance" between two documents, or strings, is the length of a minimal sequence of insertions, deletions, and substitutions that transforms one to the other.

At step 514 the same process is repeated for successively non-increasing length matches until the length of the matches decrements to single characters. Thus, the program would then detect the AB passage in the two strings and assign a unique identifier to it. In the described embodiment, all characters that had no matches, such as H or W in string 2, keep as their identifier their original hash values. Thus, assuming the following identifiers for the passages in the two strings:

H: h Z: z

FLK: m W: w

X: x

AB: i the strings can be represented as: "hmxi" and "izmw". Thus, the strings on which matching is now performed have letters as identifiers that represent many more characters in the original document. Each of the identifiers in these strings have associated position and length information.

After step 514, the program can use more expensive techniques on these simplified strings to present similar passags to the user at a step 516. In a preferred embodiment, each lower case letter in the two strings can be represented by a color. The text represented by those passages are presented to the user in a particular color and the user can compare passages that have the color in two or more documents to see actual text and the location of the text that appears in those documents. For example, with the two strings above, the passage FLK can be shown in red in both documents and the passage AB can be shown in blue. The user can then determine quickly what passages are the same in the two documents. In other preferred embodiments, other indicators can be used to efficiently present similar passages in the documents to the user. For example, similarities among documents can be shown using graphical summaries, such as colored histograms or multiple color bars, which correspond to the colored text described above. In addition, passages from multiple documents can be aggregated in different ways depending on the user interface and user needs. For example, information on a subset of documents within a cluster can be presented to a user in cases where information on the full set of documents would be skewed. This can occur because of one unusual document in the cluster having properties that throw off similarities present in the other documents, where those similarities may be more informative to the user. At a step 518 the program retrieves the next cluster of documents as derived in step 414 of FIG. 4a and repeats the process from step 502. If there are no more clusters the process is done.

As discussed above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 6:
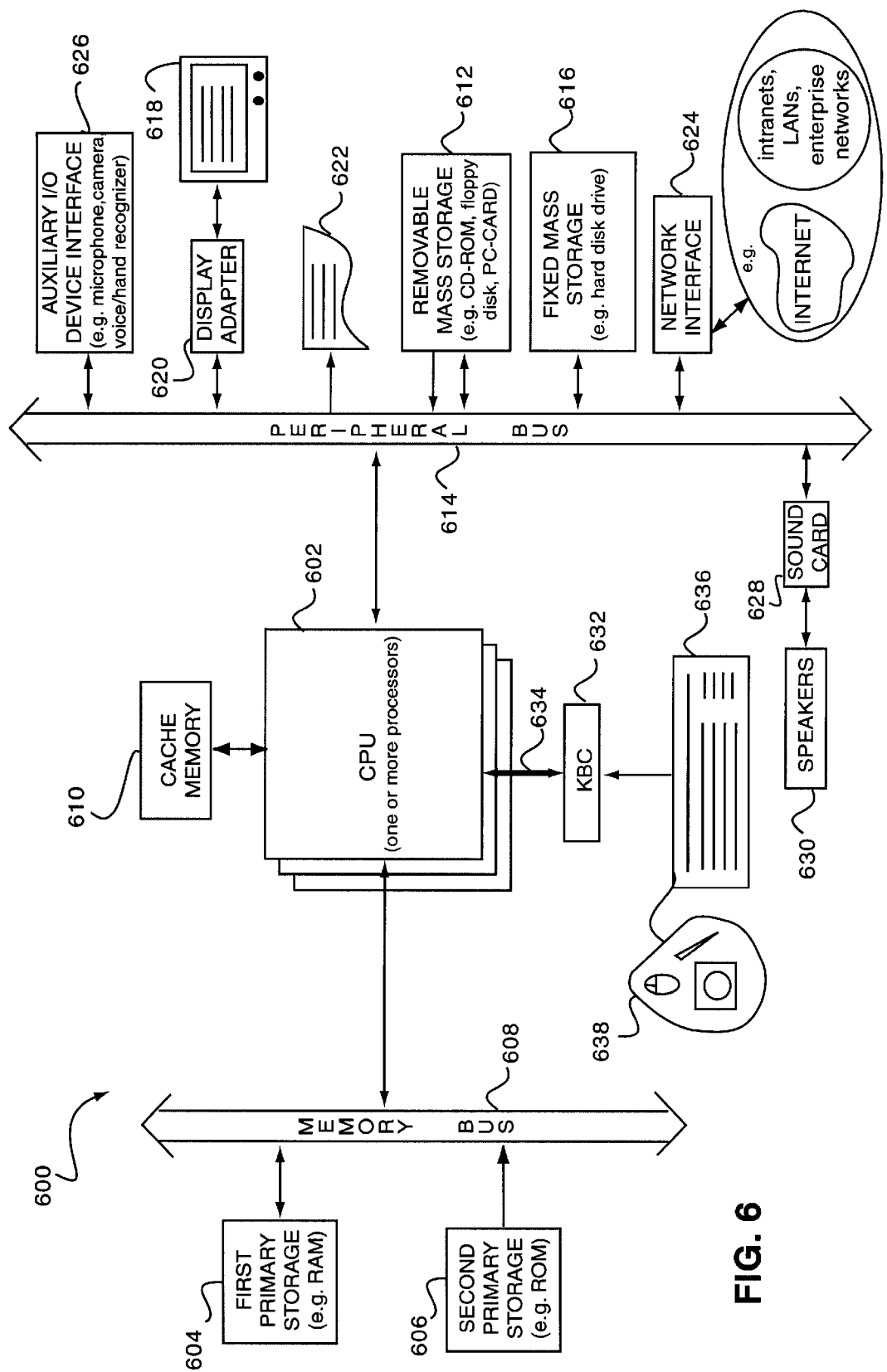
FIG. 6 is a block diagram of a typical computer system suitable for implementing an embodiment of the present invention.

FIG. 6 is a block diagram of a general purpose computer system 600 suitable for carrying out the processing in accordance with one embodiment of the present invention. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. CPU 602 is a general purpose digital processor which controls the operation of the computer system 600. Using instructions retrieved from memory, the CPU 602 controls the reception and manipulation of input data, and the output and display of data on output devices.

CPU 602 is coupled bi-directionally with a first primary storage 604, typically a random access memory (RAM), and uni-directionally with a second primary storage area 606, typically a read-only memory (ROM), via a memory bus 608. As is well known in the art, primary storage 604 can be used as a general storage area and as scratch-pad memory, and can also be used to store input data and processed data. It can also store programming instructions and data, in the form of message stores or shared allocated memory holding thread-specific data cells, in addition to other data and instructions for processes operating on CPU 602, and is used typically used for fast transfer of data and instructions in a bi-directional manner over the memory bus 608. Also as well known in the art, primary storage 606 typically includes basic operating instructions, program code, data and objects used by the CPU 602 to perform its functions. Primary storage devices 604 and 606 may include any suitable computer-readable storage media, described below, depending on whether, for example, data access needs to be bi-directional or uni-directional. CPU 602 can also directly and very rapidly retrieve and store frequently needed data in a cache memory 610.

A removable mass storage device 612 provides additional data storage capacity for the computer system 600, and is coupled either bi-directionally or uni-directionally to CPU 602 via a peripheral bus 614. For example, a specific removable mass storage device commonly known as a CD-ROM typically passes data uni-directionally to the CPU 602, whereas a floppy disk can pass data bi-directionally to the CPU 602. Storage 612 may also include computer-readable media such as magnetic tape, flash memory, signals embodied on a carrier wave, PC-CARDS, portable mass storage devices, holographic storage devices, and other storage devices. A fixed mass storage 616 also provides additional data storage capacity and is coupled bi-directionally to CPU 602 via peripheral bus 614. The most common example of mass storage 616 is a hard disk drive. Generally, access to these media is slower than access to primary storages 604 and 606. Mass storage 612 and 616 generally store additional programming instructions, data, and the like that typically are not in active use by the CPU 602. It will be appreciated that the information retained within mass storage 612 and 616 may be incorporated, if needed, in standard fashion as part of primary storage 604 (e.g. RAM) as virtual memory.

In addition to providing CPU 602 access to storage subsystems, the peripheral bus 614 is used to provide access other subsystems and devices as well. In the described embodiment, these include a display monitor 618 and adapter 620, a printer device 622, a network interface 624, an auxiliary input/output device interface 626, a sound card 628 and speakers 630, and other subsystems as needed.

The network interface 624 allows CPU 602 to be coupled to another computer, computer network, or telecommunications network using a network connection as shown. Through the network interface 624, it is contemplated that the CPU 602 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 624.

Auxiliary I/O device interface 626 represents general and customized interfaces that allow the CPU 602 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 602 is a keyboard controller 632 via a local bus 634 for receiving input from a keyboard 636 or a pointer device 638, and sending decoded symbols from the keyboard 636 or pointer device 638 to the CPU 602. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 608, peripheral bus 614, and local bus 634 are illustrative of any interconnection scheme serving to link the subsystems. For example, a local bus could be used to connect the CPU to fixed mass storage 616 and display adapter 620. The computer system shown in FIG. 6 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims.

Furthermore, it should be noted that there are alternative ways of implementing both the process and apparatus of the present invention. For example, the hash function can be applied to variable length substrings instead of fixed length substrings. In another example, data structures other than a hash table, such as a neural network, can be used to implement the index file. In another example, methods other than the union/find algorithm can be used to cluster documents. In yet another example, a binary tree or table can be used in place of a B-tree for storing document name and range information. In addition, although the present invention has been described in the context of detecting plagiarism (copying) among a set of documents, it has many other applications. For example, it can be used in the legal field for litigation support, intellectual property security, checking for document updates, providing automatic version history, providing copyright protection on the Internet, merging redundant program code segments, and software clone detection. The program can also be used as a supplement to or as a component in other computer-based applications such as search engines, database systems, document management systems, file systems, and information retrieval. Accordingly, the present embodiments are to be considered as illustrative and not restrictive, and the invention is not to be limited to the details given herein, but may be modified within the scope and equivalents of the appended claims.

What is claimed is:

1. A method of comparing a query file to one or more stored files, the method comprising:

receiving a query file having a plurality of query file substrings;

selecting a first query file substring from the plurality of query file substrings;

preprocessing the first query file substring thereby making the substring more suitable for searching in the storage area;

searching a storage area storing a plurality of ordered file substrings for the first query file substring;

storing match data relating to a match between the first query file substring and a first ordered file substring; and joining the first ordered file substring and a second ordered file substring if the first ordered file substring and the second ordered file substring are in a particular sequence and joining the first query file substring and a second query file substring if the first query file substring and the second query file substring are in the same particular sequences wherein the second ordered file substring and the second query file substring match, thereby forming a third coalesced ordered file substring and a third coalesced query file substring that can be used to format output comparison data.

2. A method as recited in claim 1 further comprising preprocessing the first query file substring thereby making the substring more suitable for searching in the storage area.

3. A method as recited in claim 1 further comprising deriving an identifier corresponding to the first query substring using a predetermined function and using the identifier to perform searches in the storage area and identify matches between the plurality of query file substrings and the plurality of ordered file substrings.

4. A method as recited in claim 1 further comprising determining whether the query file can be integrated with one or more groups of stored files by comparing the query file with a stored file from each of the one or more groups of stored files.

5. A method as recited in claim 4 further comprising qualifying a query file for integration with one or more groups of stored files by examining the number of matches between the plurality of query file substrings and ordered file substrings from a particular stored file.

6. A method as recited in claim 1 wherein the match data includes a plurality of query file substring positions paired with a plurality of corresponding ordered file substring positions, the corresponding ordered file substrings arranged in segments corresponding to stored files.

7. A method as recited in claim 1 wherein joining the first ordered file substring and the second ordered file substring further comprises eliminating overlaps between two ordered file substrings.

8. A method as recited in claim 7 further comprising segmenting the two ordered file substrings into three sub-segments including a first sub-segment formed from a first of the two ordered file substrings, a second sub-segment formed from an overlap between the two ordered file substrings, and a third sub-segment formed from a second of the two ordered file substrings.

9. A method as recited in claim 1 further comprising identifying a longest length match between a plurality of third coalesced ordered file substrings and a plurality of third coalesced query file substrings and removing third coalesced indexed file substrings and third coalesced query file substrings corresponding to the longest length match, whereby duplicate query file substrings and ordered file substrings do not effect output comparison data.

10. A method as recited in claim 9 further comprising repeating the identification and removal of the longest length match between the plurality of third coalesced ordered file substrings and the plurality of third coalesced query file substrings.

11. A method as recited in claim 10 further comprising assigning the longest length match a unique name thereby transforming the plurality of query file substrings into a simplified query file string and the plurality of ordered file substrings into a simplified file string, wherein the simplified query file string and the simplified file string include a plurality of unique names.

12. A method as recited in claim 11 further comprising assigning an indicator to each one of the plurality of unique names for display as output comparison data associated with the query file and one or more of the stored files.

13. A system for comparing a query file to one or more stored files, the system comprising:
 a file segmenter for creating a plurality of query file substrings from a query file;
 a substring preprocessor for preprocessing the first query file substring thereby making the substring more suitable for searching in the storage area:
 a storage searcher for searching a storage area storing a plurality of ordered file substrings for a first query file substring;
 a data storer for storing match data relating to a match between the first query file substring and a first ordered file substring; and
 a substring coalescer for joining the first ordered file substring and a second ordered file substring if the first ordered file substring and the second ordered file substring are in a particular sequence and for joining the first query file substring and a second query file substring if the first query file substring and the second query file substring are in the same particular sequence wherein the second ordered file substring and the second query file substring match, the substring coalescer thereby forming a third coalesced ordered file substring and a third coalesced query file substring that can be used to format output comparison data.

14. A computer readable medium containing programmed instructions for comparing a query file to one or more stored files, the programmed instructions comprising:
 a computer code for receiving a query file having a plurality of query file substrings;
 a computer code for selecting a first query file substring from the plurality of query file sub strings;
 a computer code for preprocessing the first query file substring thereby making the substring more suitable for searching in the storage area
 a computer code for searching a storage area storing a plurality of ordered file substrings for the first query file substring;
 a computer code for storing match data relating to a match between the first query file substring and a first ordered file substring; and
 a computer code for joining the first ordered file substring and a second ordered file substring if the first ordered file substring and the second ordered file substring are in a particular sequence and for joining the first query file substring and a second query file substring if the first query file substring and the second query file substring are in the same particular sequence wherein the second ordered file substring and the second query file substring match, thereby forming a third coalesced ordered file substring and a third coalesced query file substring that can be used to format output comparison data.

* * * * *